United States Patent [19]

Bennett

[11] Patent Number: 4,466,111

[45] Date of Patent: Aug. 14, 1984

[54] SYNCHRONIZATION APPARATUS AND METHOD

[75] Inventor: James F. Bennett, Sudbury, Mass.

[73] Assignee: GTE Products Corporation, Waltham, Mass.

[21] Appl. No.: 325,607

[22] Filed: Nov. 27, 1981

[51] Int. Cl.³ .............................................. H04L 7/04
[52] U.S. Cl. .................................... 375/111; 375/118
[58] Field of Search .................... 371/42, 47; 375/118, 375/111; 307/269

[56] References Cited

U.S. PATENT DOCUMENTS

4,119,796  10/1978  Jones ..................................... 375/111
4,302,831  11/1981  Zemanek ........................... 371/47 X Primary Examiner—Jerry Smith
Assistant Examiner—Clark A. Jablon
Attorney, Agent, or Firm—Fred Fisher; Peter Xiarhos

[57] ABSTRACT

Synchronization apparatus and method for maintaining synchronization between a binary encoded signal and a timing signal generated in the apparatus and employed in processing the binary encoded signal. The synchronization apparatus includes an up/down binary counter operative to sample the binary encoded signal at a predetermined rate and to count upwardly for each sample of the binary encoded signal having the first logic value and to count downwardly for each sample of the binary encoded signal having the second logic value. A timing signal generated within the synchronization apparatus and including a plurality of pairs of timing pulses is employed to ascertain the values of the counts in the up/down counter at the times of each pair of timing pulses. The values of these counts are examined over a period of several (e.g., 8) pairs of the timing pulses to determine whether the binary encoded signal is in synchronism with, leads, or lags the timing signal. If a lead or lag situation is determined to exist, the timing relationship of the binary encoded signal and the timing signal is altered to bring the signals back into synchronism.

20 Claims, 11 Drawing Figures

SYNCHRONIZATION APPARATUS AND METHOD

The invention herein described was made in the course of a contract with the Department of the Army.

FIELD OF THE INVENTION

The present invention relates to synchronization apparatus and, more particularly, to synchronization apparatus for maintaining synchronization between a binary encoded data signal and sampling signals employed in processing the binary encoded data signal. The invention also relates to the method by which the above result is achieved.

BACKGROUND OF THE INVENTION

There are many communication system applications in which is it desired to convert the transmission rate of binary encoded data signals from a first value to a second value. The first transmission rate of the binary encoded signals may have a value within a first range, for example, 45.5 baud (bits/second) to 16,000 baud, and the second transmission rate may have a value within a second range, for example, 2400–32,000 baud. In effecting the conversion of the binary encoded signals from the first transmission rate to the second transmission rate, it is a common practice to generate sampling signals for sampling the binary encoded signals. Desirably, the sampling signals should occur at precise times relative to the sampled signals so that the two signals are properly synchronized with each other and the binary content of the sampled signals can effectively be recovered. However, should the sampled binary encoded signals and/or the sampling signals become shifted in time relative to each other such that the signals are no longer in synchronism, that is, one of the signals leads or lags the other, it becomes necessary to adjust the timing of the signals relative to each other so that they are brought back into proper synchronism.

BRIEF SUMMARY OF THE INVENTION

A synchronization apparatus in accordance with the present invention includes a sampling counter means arranged to receive a binary encoded signal of a predetermined rate and comprising bits of first and/or second logic values, and an associated sample clock signal of a predetermined rate. A timer means is arranged to receive the aforesaid sample clock signal and operates to produce a timing signal of a rate twice that of the binary encoded signal and comprising a series of successive pairs of pulses A and B. The sampling counter means is capable of counting in positive and negative directions and operates to sample the binary encoded signal at the rate of the sample clock signal and to count upwardly in binary fashion in response to each sample of the binary encoded signal having the first logic value and to count downwardly in binary fashion in response to each sample of the binary encoded signal having the second logic value.

A first means operates at the occurrence of each A pulse of the timing signal produced by the timer means to retain the then existing count of the sampling counter means, which may have a positive or negative signed value expressed by $A_i$, and to multiply the value of said count by a factor of 2 thereby to provide a resultant quantity expressed by $2A_i$. The first means further operates at the occurrence of each B pulse of the timing signal produced by the timer means to retain the then existing binary count of the sampling counter means. This latter count may have a positive or negative signed value and be expressed by $B_i$.

A second means associated with the first means is arranged to receive each set of the quantities expressed by $2A_i$ and $B_i$ corresponding to each pair of pulses A and B, and operates to calculate a value and associated positive or negative sign for the expression represented by $$\sum_{i=1}^{M} \frac{|(B_i - 2A_i)| \times B_{signBi}}{KM},$$

where i, M and K are positive integers, i has a value of 1 to M, and sign $B_i$ represents the positive or negative sign of the quantity $B_i$. The second means further operates to produce and apply a signal having a value and associated sign as calculated from the foregoing expression to the timer means for altering the timing relationship between the binary encoded signal and the timing signal produced by the timing means by an amount and direction in accordance with said value and associated sign.

DETAILED DESCRIPTION OF THE INVENTION

Figure 1:
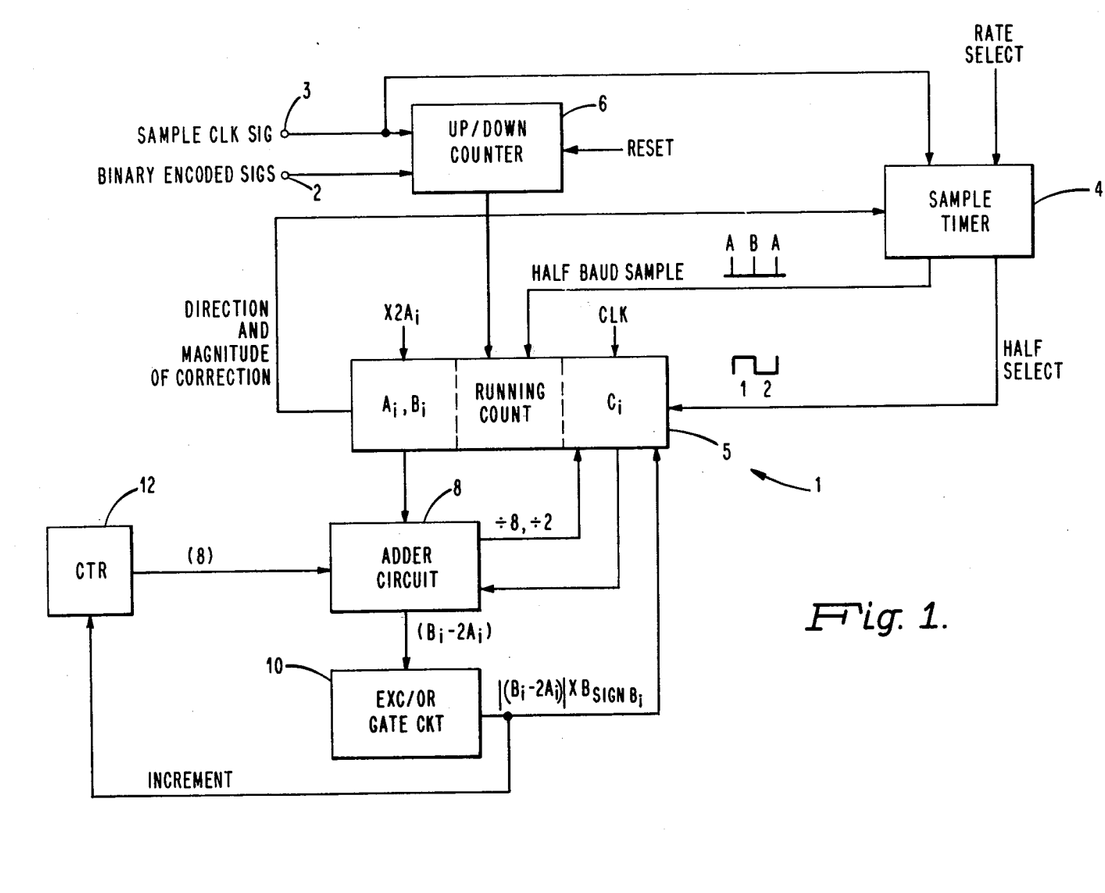
FIG. 1 is a schematic block diagram of a synchronization apparatus in accordance with a first embodiment of the invention for maintaining synchronization between a binary encoded signal received by the apparatus and sampling signals generated within the apparatus.
Figure 2A:
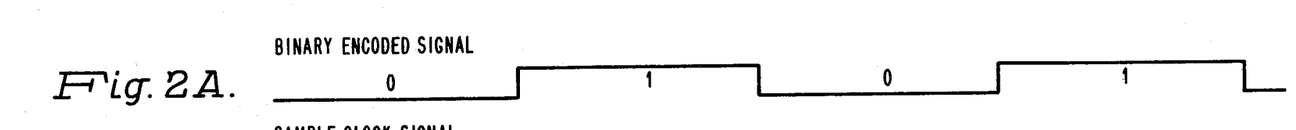
FIGS. 2A–2C illustrate a first signal timing relationship in which the sampling signals generated within the synchronization apparatus of FIG. 1 and the binary encoded signal received by the apparatus are in proper synchronism with each other.
Figure 2B:
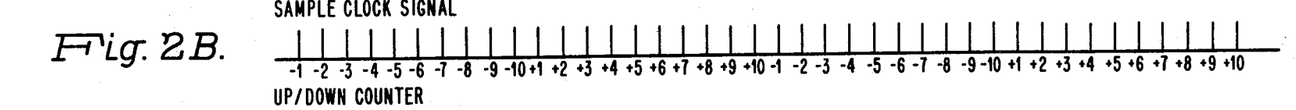

Referring now to FIG. 1, there is shown a synchronization apparatus 1 in accordance with a first embodiment of the invention. The synchronization apparatus 1 as shown in FIG. 1 is arranged to receive binary encoded data signals at a first input terminal 2 and a data sample clock signal corresponding to the binary encoded data signals at a second input terminal 3. Each binary encoded data signal as received at the input terminal 2 has an exemplary form as shown in FIG. 2A and the sample clock signal as received at the input 3 of the synchronization apparatus 1 has an exemplary form as shown in FIG. 2B. The synchronization apparatus 1 as described herein may be utilized with binary encoded signals having a transmission rate of between 45.5 baud (bits/second) and 16,000 baud and a sample clock signal having a rate of between 2400 and 32,000 baud.

Figure 2C:
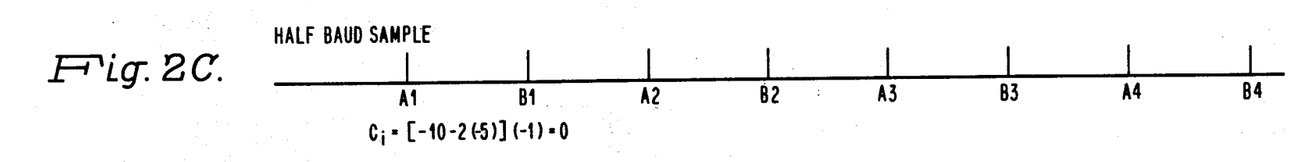

The operation of the synchronization apparatus 1 of FIG. 1 is initiated by a sample timer 4. The sample timer 4 is arranged to receive the sample clock signal as presented to the input terminal 3 and also an externally applied signal designated RATE SELECT. The RATE SELECT signal is a binary encoded signal having a value corresponding to the particular data rate of the received binary encoded signal (at the terminal 2). The RATE SELECT signal, when applied to the sample timer 4, causes the sample timer 4 to produce and apply to a register 5 a pair of signals designated HALF BAUD SAMPLE and HALF SELECT. The HALF BAUD SAMPLE signal, an exemplary form of which is shown in FIG. 2C, is a timing signal having a frequency or rate twice that of the received binary encoded signal, and comprises a series of pairs of pulses generally designated in FIG. 1 of the drawing as A and B. Since the encoded value of the RATE SELECT signal differs in accordance with the rate of the received binary encoded signal, the frequency or rate of the BAUD SAMPLE signal will also vary but it will always be twice that of the received binary encoded signal. The HALF SELECT signal produced by the sample timer 4 comprises a series of positive-going and negative-going pulses each of which has a duration equal to one-half of a bit period and has the particular timing relationship to the BAUD SAMPLE signal as indicated in FIG. 1.

As the sample timer 4 operates to produce the HALF BAUD SAMPLE and HALF SELECT signals as discussed hereinabove, a binary up/down counter 6, which receives both the binary encoded signal presented to the input terminal 2 and the sample clock signal presented to the input terminal 3, operates to sample the logic "1" and "0" values of the binary encoded signal at the particular rate of the sample clock signal. For each sampled logic "1" value, the up/down counter 6 operates to increment, or count binarily upwardly, by one count, and for each sampled logic "0" value, the up/down counter 6 operates to decrement, or count binarily downwardly, by one count. The counter 6 is capable of counting in both positive and negative directions. For the worst case situation, represented by a transmission rate of 45.5 baud for the binary encoded signal and a rate of 32,000 baud for the sample clock signal, the up/down counter 6 should have a capacity for counting up to 704 logic 1's or 704 logic 0's. For this reason, the up/down counter 6 is arranged to have eleven stages.

As the up/down counter 6 samples the logic values of the binary encoded signal as discussed hereinabove, a running count of the sampled values, including the sign (plus or minus) of the count, is maintained within the aforementioned register 5. As will be discussed in detail hereinafter, this running count is examined at the particular times of the pulses A and B of the aforementioned HALF BAUD SAMPLE timing signal to determine if the binary encoded signal and the HALF BAUD SAMPLE signal are in synchronism.

Figure 3A:
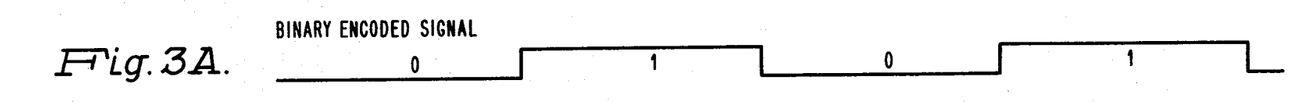
FIGS. 3A–3C illustrate a second signal timing relationship in which the sampling signals generated within the synchronization apparatus of FIG. 1 lag the binary encoded signal received by the apparatus.
Figure 3B:
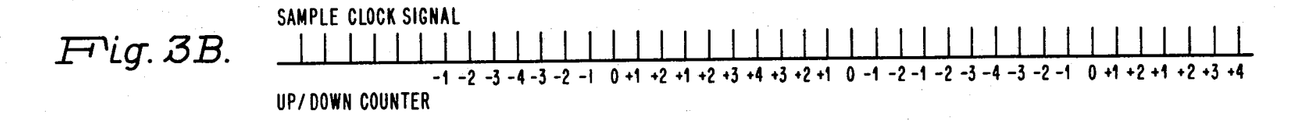
Figure 3C:
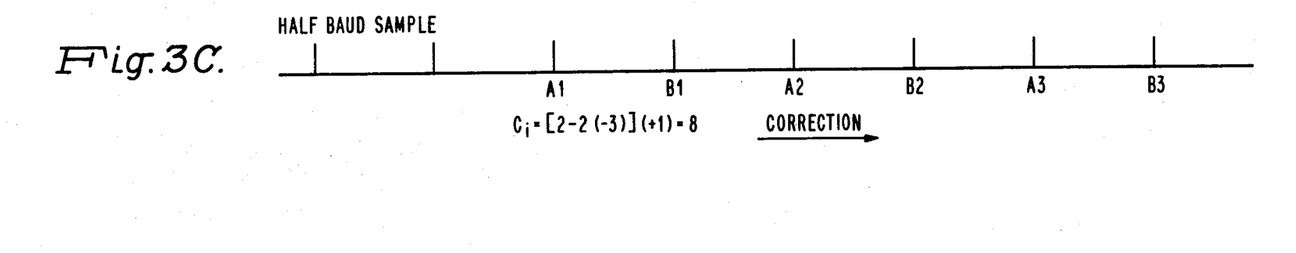
Figure 4A:
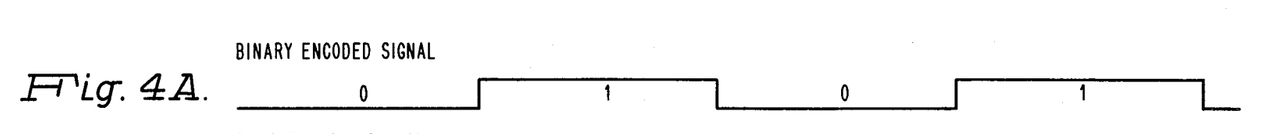
FIGS. 4A–4C illustrate a third signal timing relationship in which the sampling signals generated within the synchronization apparatus of FIG. 1 lead the binary encoded signal received by the apparatus.
Figure 4B:
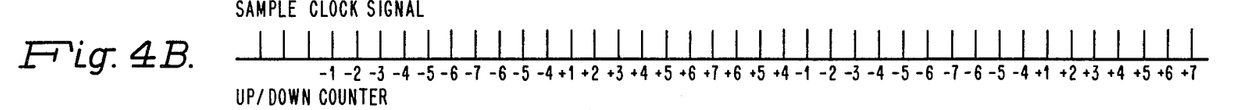
Figure 4C:
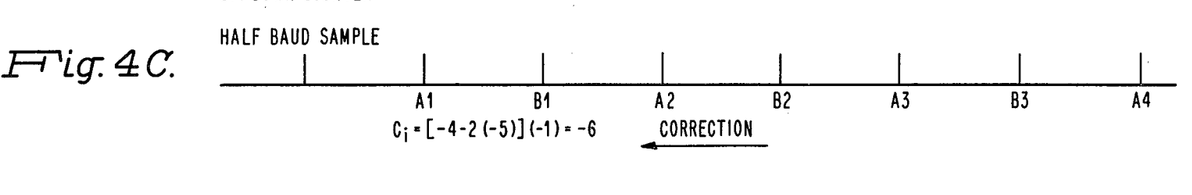

The binary encoded signal and the HALF BAUD SAMPLE signal may have three possible timing relationships. Specifically, the binary encoded signal and the HALF BAUD SAMPLE signal may be in synchronism with each other, the binary encoded signal may lead the HALF BAUD SAMPLE signal, or the binary encoded signal may lag the HALF BAUD signal. The in-synchronization situation is depicted in FIGS. 2A-2C, the lead situation is depicted in FIGS. 3A-3C, and the lag situation is depicted in FIGS. 4A-4C. The lead and lag situations may typically occur as a result of noise or errors in the transmission of the binary encoded signals, slight variations in transmission rate of the binary encoded signals, initialization or start-up conditions, etc.

When the binary encoded signal and the HALF BAUD SAMPLE signal are in synchronism with each other (FIGS. 2A-2C), the up/down counter 6 counts continuously during the time of a bit period in one direction or the other, depending on the particular logic value of the sampled bit of the encoded signal, and any given pair of successive pulses A and B of the HALF BAUD SAMPLE signal occur just after the mid-point and end point of the period of a corresponding bit of the encoded signal. The pair of pulses A and B of the HALF BAUD SAMPLE signal also occur just after the mid-count and final count of the counter 6 corresponding to the bit of the encoded signal. In lead and lag situations as indicated in FIGS. 3A-3C and FIGS. 4A-4C, when the binary encoded signal leads or lags the HALF BAUD SAMPLE signal, the up/down counter 6 counts both upwardly and downwardly during the time of a single bit period, and the pulses A and B of the HALF BAUD SAMPLE signal occur either later (FIGS. 3A-3C) or earlier (FIGS. 4A-4C) with respect to the mid-points and end points of the periods of the bits of the binary encoded signal.

In accordance with the present invention, the detection of any one of the three above-mentioned timing relationships, and any necessary correction of the relative timing of the binary encoded signal and the HALF BAUD SAMPLE signal, is accomplished in the following manner. At each pulse A of the HALF BAUD SAMPLE signal, the then existing count in the up/down counter 6, which is retained within the register 5 as previously mentioned, is multiplied by a factor of 2, and the resultant quantity, which may be generally expressed mathematically by $2A_i$, is subtracted from the count retained within the register 5 at the time of each pulse B of the HALF BAUD SAMPLE signal. This last count may be generally expressed by $B_i$. The multiplication of the value of the count in the register 5 at the time of each A pulse is accomplished by the application of an $X2A_i$ signal to the register 5. This signal is produced at the concurrence of the A pulse and a corresponding one of the square-wave pulses of the aforementioned HALF SELECT signal (FIG. 1), and causes the binary count data in the register 5 at the time of the A pulse to be shifted to the left one bit position thereby to effectively multiply the count value in the register 5 at the time of the pulse A by a factor of 2. When the count in the up/down counter 6 at the time of the pulse B has been applied to and retained within the register 5, the counter 6 is caused to be reset, and the contents of the register 5 corresponding to the values of $2A_i$ and $B_i$ are applied to an adder circuit 8. The resetting of the up/down counter 6 is accomplished by a RESET signal which is produced at the concurrence of the B pulse of the HALF BAUD signal and a corresponding one of the pulses of the HALF SELECT signal.

The adder circuit 8 operates to derive a value for the expression $|(B_i-2A_i)|$. This operation may be performed by simply taking the negative of one of the expressions $B_i$ and $2A_i$ and adding it to the other expression in a standard adder device, and generating an absolute value thereof. Once a value for the expression $|(B_i-2A_i)|$ has been obtained by the adder circuit 8, the value of the expression $|(B_i-2A_i)|$ is then multiplied by the sign, plus (positive) or minus (negative), of the binary count in the up/down counter 6 (and in the register 5) as of the time of the pulse B of the HALF BAUD SAMPLE signal. This operation is performed to determine whether a lead or lag situation exists and can be expressed mathematically by $C=|(B_i-2A_i)|\times B_{sign\ Bi}$. The value of the foregoing expression for $C_i$ is determined by an EXCLUSIVE/OR gate circuit 10. This circuit functions as a true-complement gate and operates to pass the value of the expression $B_i-2A_i$ therethrough unchanged if the sign of $B_i$ is positive (plus) and to complement the value of the expression $B_i-2A_i$ if the sign of $B_i$ is negative (minus). The value and sign of the expression $|(B_i-2A_i)|\times B_{sign\ Bi}$ are applied by the EXCLUSIVE/OR gate circuit 10 back to, and retained within, the register 5.

If the value of the expression $C_i=|(B_i-2A_i)|\times B_{sign\ Bi}$ is ascertained to be 0, this result indicates that the binary encoded signal and the HALF BAUD SAMPLE signal are in phase for the period in question. This situation is depicted in FIGS. 2A-2C in which $C_i=[-10-2(-5)](-1)=0$. If the value of $C_i$ is determined to be a positive number, this result indicates that the binary encoded signal leads the HALF BAUD SAMPLE signal for the period in question. This situation is depicted in FIGS. 3A-3C in which $C_i=[2-2(-3)](+1)=8$. In similar fashion, if the value of $C_i$ is determined to be a negative number, this result indicates that the binary encoded signal lags the HALF BAUD SAMPLE signal for the period in question. This situation is depicted in FIGS. 4A-4C in which $C_i=[-4-2(-5)](-1)=-6$.

In accordance with the present invention, a large number of sampling operations as described hereinabove, for example, eight (M=8) operations employing eight sets of A and B pulses (only three sets being shown in the drawing), are utilized, and the eight values for $C_i$ are added together and then averaged over the eight operations. The correction to be made after the M=8 operations can be generally expressed mathematically by $$C = \frac{\sum_{i=1}^{M} |(B_i - 2A_i)| \times B_{sign\ Bi}}{2M}$$

The total of eight sampling operations or sequences are accomplished under control of a counter 12 which is capable of counting to M=8, and is incremented by the EXCLUSIVE/OR gate circuit 10 as each of the eight values of $C_i$ is applied to and retained in the register 5. At the count of M=8, the counter 12 operates to cause the adder circuit 8 to add the total of eight values of $C_i$ as stored in the register 5. The resulting value after the addition operation is then returned to the register 5, and the register 5 is shifted three bits to the right (e.g., by gating three clocks pulses to the register 5) to effectively divide the total value for C by M=8. Division of the last value by a factor of 2 is accomplished by an additional shift of the data in the register 5 by one bit position to the right. At the conclusion of this last operation, the register 5 contains the binary data specifying the magnitude of any correction needed and the direction of the correction. This correction data is applied to the sample timer 4 and causes a specified number of pulses of the sample clock signal received by the sample timer 4 to be inhibited in accordance with the correction data (for a lead situation), or additional pulses to be added to the sample clock signal (for a lag situation), or neither, if the value of C as described hereinabove was 0.

From the above discussion and with reference to FIGS. 2A-2C, 3A-3C, and 4A-4D, it will be appreciated that for eight like sampling operations or sequences (although only three sequences are specifically shown in the drawing) the value of C for the situation depicted in FIGS. 2A-2C is 0, the value of C for the situation depicted in FIGS. 3A-3C is +4, and the value of C for the situation depicted in FIGS. 4A-4C is −3. Thus, in the situation represented by FIGS. 3A-3C, four clock pulses of the sample clock signal must be inhibited. In the situation represented by FIGS. 4A-4C, three clock pulses must be added to the sample clock signal. Although not specifically shown in the drawing, these additions and inhibiting of clock pulses can be readily accomplished by combining pulses from a second pulse train with the sample clock signal (to add pulses) or inhibiting pulses from the sample clock signal by means of a gated inhibit signal. As a result of the above changes in the sample clock signal, the timing of the sample timer 4 is altered to bring the binary encoded signal back into synchronism with the HALF BAUD SAMPLE signal.

Figure 5:
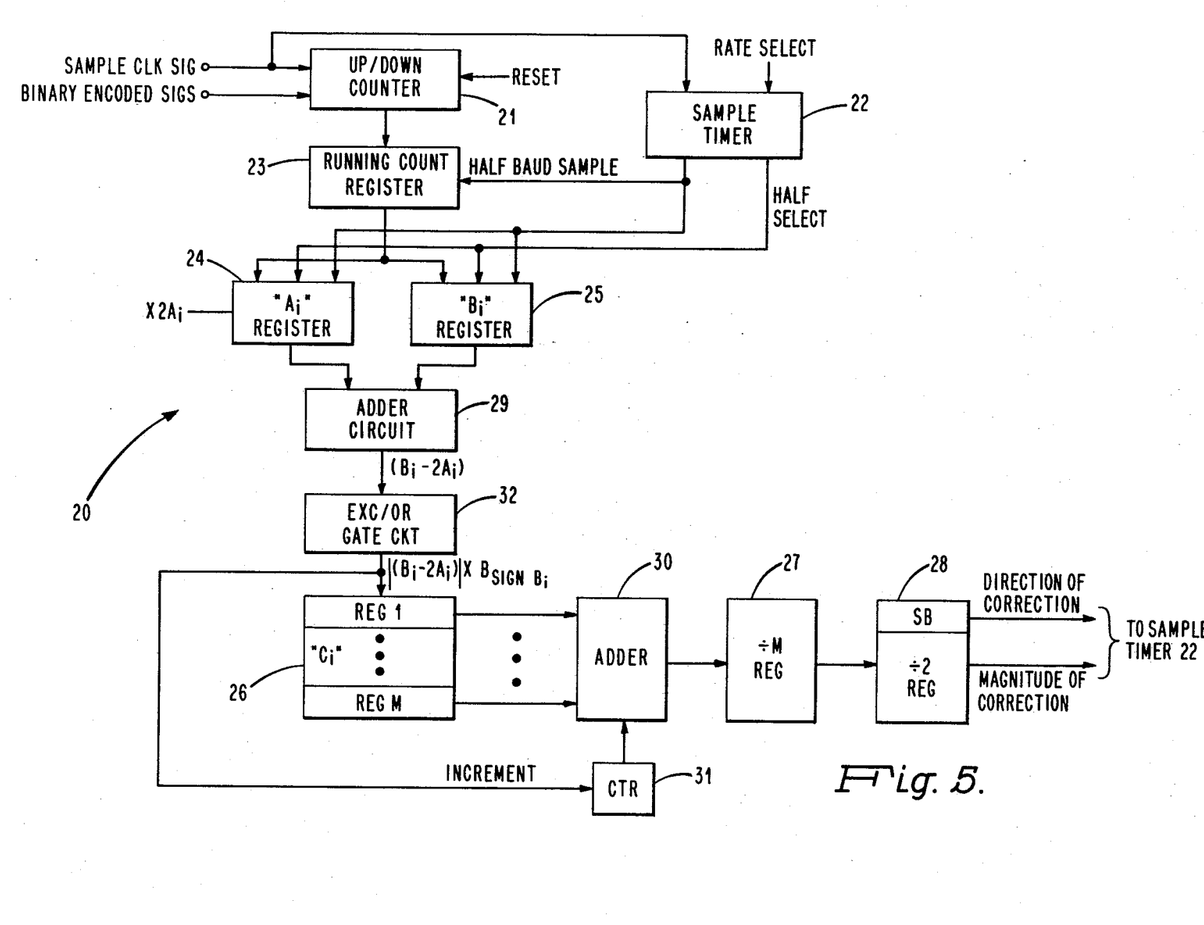
FIG. 5 is a schematic block diagram of a synchronization apparatus in accordance with a second embodiment of the invention.

In the above discussion, both the register 5 and the adder circuit 8 have been described as performing multiple storage and adding operations. The reason for such multiple use of the register 5 and the adder circuit 8 is for economy of components in the synchronization apparatus 1. However, it is to be appreciated that where component count is not a critical factor, the same functions as performed by the synchronization apparatus 1 in FIG. 1 can be performed using separate components. Such an arrangement is shown at 20 in FIG. 5. In the synchronization apparatus 20 shown in FIG. 5, an up/down counter 21 and a sample timer 22 are utilized in the same manner as in the synchronization apparatus 1 of FIG. 1. However, individual registers 23-28 are used for storing a running count of the up/down counter 22 (register 23), for storing values of $A_i$ and $B_i$ (registers 24 and 25), for storing the sum of eight $C_i$ values (register 26), for storing the value of the count to be divided by M=8 (register 27), and for storing the value of the count to be divided by a factor of 2 (register 28). An adder circuit 29 is used, as before, to perform the subtraction operation $B_i-2A_i$, and an adder circuit 30 is used, under control of a counter 31, to sum together the M=8 values of $C_i$. An EXCLUSIVE/OR gate circuit 32 is used, as before, to derive a value for the expression $|(B_i-2A_i)|\times B_{sign\ Bi}$.

While there has been described what are considered to be preferred embodiments of the invention, it will be apparent to those skilled in the art that various changes and modifications may be made therein without departing from the invention as called for in the appended claims.

What is claimed is:

1. A synchronization apparatus comprising:
sampling counter means arranged to receive a binary encoded signal of a predetermined rate and an associated sample clock signal of a predetermined rate, said binary encoded signal comprising bits of first and/or second logic values;
timer means arranged to receive the aforesaid sample clock signal and operative to produce a timing signal of a rate twice that of the binary encoded signal, said timing signal comprising a series of successive pairs of pulses A and B;

said sampling counter means being capable of counting in positive and negative directions and being operative to sample the binary encoded signal at the rate of the sample clock signal and to count upwardly in binary fashion in response to each sample of the binary encoded signal having the first logic value and to count downwardly in binary fashion in response to each sample of the binary encoded signal having the second logic value;

first means operative at the occurrence of each A pulse of the timing signal produced by the timer means to retain the then existing binary count of the sampling counter means, said count having a positive or negative signed value expressed by $A_i$, and to multiply the value of said count by a factor of 2 thereby to provide a resultant quantity expressed by $2A_i$, and further operative at the occurrence of each B pulse of the timing signal produced by the timer means to retain the then existing binary count of the sampling counter means, said count having a positive or negative signed value and expressed by $B_i$; and second means associated with the first means and arranged to receive each set of the quantities expressed by $2A_i$ and $B_i$ corresponding to each pair of pulses A and B, said second means being operative to calculate a value and associated positive or negative sign for the expression represented by $$\sum_{i=1}^{M} \frac{|(B_i - 2A_i)| \times B_{sign B_i}}{KM},$$

where i, M and K are positive integers, i has a value of 1 to M, and sign $B_i$ represents the positive or negative sign of the quantity $B_i$, said second means being further operative to produce and apply a signal having a value and associated sign as calculated from the foregoing expression to the timer means for altering the timing relationship between the binary encoded signal and the timing signal produced by the timing means by an amount and direction in accordance with said value and associated sign.

2. A synchronization apparatus in accordance with claim 1 wherein the second means comprises:

third means operative for each set of values for $2A_i$ and $B_i$ corresponding to each pair of pulses A and B to subtract the value of $2A_i$ from $B_i$ and to multiply the resultant quantity by the positive or negative sign of $B_i$, thereby to provide a resultant quantity expressed by $C_i$;

fourth means operative to retain and to add together M successive values of $C_i$ for i=1 to M, thereby to provide a sum expressed by $$\sum_{i=1}^{M} |(B_i - 2A_i)| \times B_{sign B_i},$$

where M is a positive integer and sign $B_i$ represents the positive or negative sign of the quantity $B_i$;

fifth means operative to derive an average of the M summed values of $C_i$, said average being a quantity expressed by $$\sum_{i=1}^{M} \frac{|(B_i - 2A_i)| \times B_{sign B_i}}{M} ; \text{ and}$$

sixth means operative to divide the average derived by the fifth means by a quantity K, where K is a positive integer, and to produce and apply to the timer means a signal having a value and associated sign as derived from the division operation for altering the timing relationship between the binary encoded signal and the timing signal produced by the timing means by an amount and direction in accordance with said value and associated sign.

3. A synchronization apparatus in accordance with claim 2 wherein:

K has a value of 2.

4. A synchronization apparatus in accordance with claim 2 wherein:

the first means, fourth means, fifth means and sixth means include a storage register.

5. A synchronization apparatus in accordance with claim 4 wherein the third means comprises:

first circuit means operative for each set of values for $2A_i$ and $B_i$ corresponding to each pair of pulses A and B to subtract the value of $2A_i$ from $B_i$, thereby to provide a resultant quantity; and second circuit means operative to multiply each resultant quantity provided by the first circuit means by the positive or negative sign of $B_i$, thereby to provide a resultant quantity expressed by $C_i$.

6. A synchronization apparatus in accordance with claim 5 wherein:

the first circuit means includes an adder circuit; and
the second circuit means includes a true-complement circuit.

7. A synchronization apparatus in accordance with claim 5 wherein:

K has a value of 2.

8. A synchronization apparatus in accordance with claim 4 wherein:

the third and fourth means include adder means operative for each set of values for $2A_i$ and $B_i$ corresponding to each pair of pulses A and B to subtract the value of $2A_i$ from $B_i$ and to add together the M successive values of $C_i$ for i=1 to M.

9. A synchronization apparatus in accordance with claim 8 wherein:

M has a value of 8; and
K has a value of 2.

10. A synchronization apparatus in accordance with claim 2 wherein the first means includes:

running count register means operative to receive and retain therein a running count and sign of the sampling counter means during the sampling operations of the sampling counter means;

"A" register means operative at the occurrence of each A pulse of the timing signal produced by the timer means to retain the then existing binary count of the sampling counter means, said count having a positive or negative signed value expressed by $A_i$, and to multiply the value of said count by a factor of 2 to provide a resultant quantity expressed by $2A_i$; and "B" register means operative at the occurrence of each B pulse of the timing signal produced by the timer means to retain the then existing binary count of the sampling counter means, said count having a positive or negative signed value expressed by $B_i$.

11. A synchronization apparatus in accordance with claim 10 wherein the third means comprises:
    first circuit means coupled to the "A" and "B" register means of the first means and operative for each set of values of $2A_i$ and $B_i$ retained in the "A" and "B" register means corresponding to each pair of pulses A and B to subtract the value of $2A_i$ from $B_i$, thereby to provide a resultant quantity; and
    second circuit means coupled to the first circuit means and operative to multiply each resultant quantity provided by the first circuit means by the positive or negative sign of $B_i$, thereby to provide a resultant quantity expressed by $C_i$.

12. A synchronization apparatus in accordance with claim 11 wherein the fourth means comprises:
    "C" storage means coupled to the second circuit means of the third means and operative to receive and retain therein in succession M successive quantities $C_i$; and
    third circuit means coupled to the "C" storage means and operative to add together the M quantities $C_i$ retained in the "C" storage means for i=1 to M, thereby to provide a sum expressed by $$\sum_{i=1}^{M} |(B_i - 2A_i)| \times B_{sign\ Bi}$$

13. A synchronization apparatus in accordance with claim 12 wherein:
    a fifth means includes:
        first divide means coupled to the third circuit means of the fourth means and operative to derive a value for the expression $$\frac{\sum_{i=1}^{M} |(B_i - 2A_i)| \times B_{sign\ Bi}}{M} \text{; and}$$

the sixth means includes:
        second divide means coupled to the first divide means and to the timer means and operative to derive a value for the expression $$\frac{\sum_{i=1}^{M} |(B_i - 2A_i)| \times B_{sign\ Bi}}{KM}$$

and to produce and apply to the timer means a signal having a value and associated sign as calculated from the foregoing expression for altering the timing relationship between the binary encoded signal and the timing signal produced by the timing means by an amount and direction in accordance with said value and associated sign.

14. A synchronization apparatus in accordance with claim 13 wherein:
    the first circuit means of the third means includes an adder circuit;
    the third circuit means of the fourth means includes an adder circuit;
    the first divide means of the fifth means includes register means for deriving the value and associated sign of the expression $$\frac{\sum_{i=1}^{M} |(B_i - 2A_i)| \times B_{sign\ Bi}}{M};$$

the second divide means of the fixth means includes register means for deriving the value and associated sign of the expression $$\frac{\sum_{i=1}^{M} |(B_i - 2A_i)| \times B_{sign\ Bi}}{KM};$$

M has a value of 8; and
    K has a value of 2.

15. A synchronization method comprising the steps of:
    providing a binary encoded signal of a predetermined rate and an associated sample clock signal of a predetermined rate, said binary encoded signal comprising bits of first and/or second logic values;
    producing a timing signal of a rate twice that of the binary encoded signal, said timing signal comprising a series of successive pairs of pulses A and B;
    sampling the logic values of the bits of the binary encoded signal at the rate of the sample clock signal and counting the samples in a running count fashion in both positive and negative directions, the count of the samples increasing in an upward direction for each sample of a bit of the binary encoded signal having the first logic value and decreasing in a downward direction for each sample of a bit of the binary encoded signal having the second logic value;
    deriving the counts provided in the previous step at the time of occurrence of each A and B pulse, each of said counts having a positive or negative signed value and being expressed by $A_i$ and $B_i$, respectively, and multiplying the value of $A_i$ by a factor of 2 thereby to provide a resultant quantity expressed by $2A_i$;
    receiving each set of quantities represented by $2A_i$ and $B_i$ corresponding to each pair of pulses A and B and calculating a value and associated positive or negative sign for the expression represented by $$\frac{\sum_{i=1}^{M} |(B_i - 2A_i)| \times B_{sign\ Bi}}{KM},$$

where i, M and K are positive integers, i has a value of 1 to M, and sign $B_i$ represents the positive or negative sign of the quantity $B_i$; and
    altering the timing relationship between the binary encoded signal and the timing signal by an amount and direction in accordance with the value and associated sign as calculated from the expression set forth in the previous step.

16. A synchronization method in accordance with claim 15 wherein:
    K has a value of 2.

17. A synchronization method in accordance with claim 15 wherein the deriving and multiplying step comprises the steps of:
    obtaining and retaining each count provided in the sampling and counting step at the time of occurrence of each A pulse, said count having a positive or negative signed value and being expressed by $A_i$;

multiplying the value of $A_i$ by a factor of 2 thereby to provide a resultant quantity expressed by $2A_i$; and obtaining and retaining each count provided in the sampling and counting step at the time of occurrence of each B pulse, said count having a positive or negative signed value and being expressed by $B_i$.

18. A synchronization method in accordance with claim 16 wherein the receiving and calculating step comprises the steps of:

receiving each set of quantities represented by $2A_i$ and $B_i$ corresponding to each pair of pulses A and B and subtracting the value of $2A_i$ from $B_i$, thereby to derive an absolute resultant quantity expressed by $|(B_i-2A_i)|$; and multiplying the resultant quantity $|(B_i-2A_i)|$ derived in the previous step by the positive or negative sign of $B_i$ thereby to provide a resultant quantity expressed by $$C_i = |(B_i-2A_i)| B_{sign\ Bi},$$

where sign $B_i$ is the positive or negative sign of the quantity $B_i$.

19. A synchronization method in accordance with claim 18 wherein the receiving and calculating step further comprises the steps of:

receiving and retaining M successive values of $C_i$ for $i=1$ to M, where i and M are positive integers;

adding together the M successive values of $C_i$, from $i=1$ to M, thereby to provide a resultant quantity expressed by $$\sum_{i=1}^{M} |(B_i - 2A_i)| \times B_{sign\ Bi};$$

dividing the resultant quantity derived in the previous step by M thereby to obtain an average of the M summed values of $C_i$, said average being represented by the expression $$\frac{\sum_{i=1}^{M} |(B_i - 2A_i)| \times B_{sign\ Bi}}{M};$$

and dividing the average derived in the previous step by K thereby to derive a quantity having a value and associated sign represented by the expression $$\frac{\sum_{i=1}^{M} |(B_i - 2A_i)| \times B_{sign\ Bi}}{KM},$$

where K is a positive integer.

20. A synchronization method in accordance with claim 19 wherein:

M has a value of 8; and

K has a value of 2.

* * * * *